S. PETROCELLI.
TOILET IMPLEMENT.
APPLICATION FILED SEPT. 20, 1909.

1,058,689.

Patented Apr. 8, 1913.

Witnesses

Inventor
Salvatore Petrocelli
By
his Attorney

UNITED STATES PATENT OFFICE.

SALVATORE PETROCELLI, OF HARTFORD, CONNECTICUT.

TOILET IMPLEMENT.

1,058,689.  Specification of Letters Patent.  Patented Apr. 8, 1913.

Application filed September 20, 1909. Serial No. 518,481.

*To all whom it may concern:*

Be it known that I, SALVATORE PETROCELLI, a citizen of the United States, and a resident of Hartford, in the county of Hartford and State of Connecticut, have invented certain new and useful Improvements in Toilet Implements, of which the following is a specification.

The object of the invention is to produce a sanitary and efficient implement for removing skin blemishes such as blackheads, skin worms, oily substances, etc.

Figure 1:
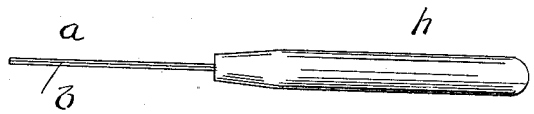
Figure 2:
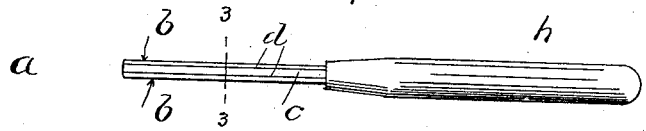
Figure 3:
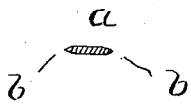

In the drawings—Figure 1 is a view of the implement showing an edge view of the blade. Fig. 2 is a view similar to Fig. 1 showing a side view of the blade. Fig. 3 is a section on the line 3—3 of Fig. 2.

The device comprises a metal blade $a$ of greater width than thickness and having one end thereof secured in a cylindrical handle —$h$—, the said blade being of uniform width which is less than the diameter of the handle. The two opposite faces —$c$— of the blade are beveled abruptly upon the longitudinal parallel lines —$d$— and form opposite dull edges —$b$— the entire length of the blade. The free end —$e$— of the blade being unsharpened provides an end which is perpendicular to the sides and edges of the blade and is of the same dimensions as the cross-sectional area of the blade and is provided with six sides.

The skin being first prepared, preferably by washing thoroughly and steaming, an edge of this implement is pressed against the skin and moved forward in that position, something similar to the manner in which a razor is used.

This implement is extremely efficient in removing blemishes and accomplishes its purpose without leaving marks or pittings in the skin or setting up irritation which causes the skin to turn red. For these reasons and because of the fact that it can be readily cleansed and sterilized it possesses great advantages over any other known device intended for a similar purpose.

I claim:—

A skin blemish removing implement for toilet purposes comprising a handle, and a relatively narrow blade secured to one end of the handle, said blade having abruptly beveled blunt edges on both sides extending throughout its length, and being of uniform hexagonal cross-section throughout and the forward end thereof being perpendicular to the longitudinal axis of the blade and to the said blunt edges.

SALVATORE PETROCELLI.

Witnesses:
 FERDINAND D'ESOPO,
 HARRY W. FREEMAN.

Copies of this patent may be obtained for five cents each, by addressing the "Commissioner of Patents, Washington, D. C."